(12) United States Patent
Gansari et al.

(10) Patent No.: US 9,480,103 B2
(45) Date of Patent: Oct. 25, 2016

(54) METHOD OF DTX DETECTION IN A WIRELESS COMMUNICATION SYSTEM

(71) Applicants: Andrei Gansari, Bucharest (RO); Anton Antal, Bucharest (RO); Andrei-Alexandru Enescu, Bucharest (RO); Bodgan-Mihai Sandoi, Bucharest (RO)

(72) Inventors: Andrei Gansari, Bucharest (RO); Anton Antal, Bucharest (RO); Andrei-Alexandru Enescu, Bucharest (RO); Bodgan-Mihai Sandoi, Bucharest (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 59 days.

(21) Appl. No.: 14/253,457

(22) Filed: Apr. 15, 2014

(65) Prior Publication Data

US 2015/0237673 A1    Aug. 20, 2015

(30) Foreign Application Priority Data

Feb. 14, 2014  (RO) .................................. 2014-00119

(51) Int. Cl.
*H04W 24/00*     (2009.01)
*H04W 76/04*     (2009.01)

(52) U.S. Cl.
CPC .................................. *H04W 76/048* (2013.01)

(58) Field of Classification Search
None
See application file for complete search history.

(56) References Cited

U.S. PATENT DOCUMENTS

| 6,782,059 | B2 | 8/2004 | Lin |
| 7,061,999 | B2 | 6/2006 | Chen |
| 7,143,178 | B2 * | 11/2006 | Glazko ..................... H04J 3/14 370/468 |
| 7,180,881 | B2 | 2/2007 | DiFazio |
| 7,437,172 | B2 | 10/2008 | Chen et al. |
| 7,782,820 | B2 | 8/2010 | Dominique et al. |
| 8,086,257 | B2 | 12/2011 | Bachl et al. |
| 9,167,522 | B2 | 10/2015 | Das |
| 2004/0081097 | A1 * | 4/2004 | Dominique ......... H04W 88/181 370/232 |
| 2004/0203463 | A1 * | 10/2004 | Chen ..................... H04L 1/0061 455/67.13 |
| 2004/0240529 | A1 | 12/2004 | Leonard et al. |
| 2006/0013163 | A1 * | 1/2006 | Lee ..................... H04B 1/7115 370/328 |

FOREIGN PATENT DOCUMENTS

WO    2008141476 A1    11/2008

OTHER PUBLICATIONS

U.S. Appl. No. 14/253,489, filed Apr. 15, 2014, entitled "Method of Discontinuous Transmission Detection".
Non-Final Office Action mailed Oct. 30, 2015 for U.S. Appl. No. 14/253,489, 8 pages.

\* cited by examiner

*Primary Examiner* — Frank Duong

(57) ABSTRACT

There is provided a network node of a wireless communication network, such as a UMTS network. The network node is arranged to perform a method of detecting Signal Discontinuous Transmission on a channel in the wireless communication network. The method comprises the receiving of a signal on the channel and the processing of a current slot of the signal, the current slot comprising a number of pilot bits and non-pilot bits. A bit error rate, a signal to noise ratio and an amplitude modulus is calculated using the pilot bits and non-pilot bits. A decision is made about whether the signal indicates a discontinuous transmission on the channel using the signal to noise ratio, the bit error rate and the amplitude modulus.

20 Claims, 7 Drawing Sheets

| Slot Format # (as in 25.211 clause 5.2.1.1) | Number of Pilot bits | Number of FBI bits | Number of TPC bits |
|---|---|---|---|
| 1 | 8 | 0 | 2 |
| 3 | 7 | 1 | 2 |
| 4 | 6 | 0 | 4 |

US 9,480,103 B2

METHOD OF DTX DETECTION IN A WIRELESS COMMUNICATION SYSTEM

CROSS REFERENCE TO RELATED APPLICATIONS

The present application is claims priority to Romanian Patent Application No. 2014 00119, filed Feb. 14, 2014, entitled "METHOD OF DTX DETECTION IN A WIRELESS COMMUNICATION SYSTEM," and is related to co-pending U.S. patent application Ser. No. 14/253,489, entitled "METHOD OF DISCONTINUOUS TRANSMISSION DETECTION," filed on Apr. 15, 2014, the entirety of which are herein incorporated by reference.

DESCRIPTION

1. Field of the Invention

This invention relates to a communication system and more particularly to a wireless communication system.

2. Background of the Invention

Wireless telephone systems are capable of carrying both voice and data over the allocated communication channels. Digital wireless telephone systems are particularly suited to carrying data over the allocated communication channels. It is possible for the system to dedicate a channel to a user, via the user equipment (UE), in order to accomplish data transmission. A continuously active channel is preferable when the anticipated data transmission is continuous. With a continuously active channel, the user is able to efficiently transmit or receive a continuous data stream over the allocated active channel of the communication system. However, the exploding increase of packet data applications, such as those used when communicating over the Internet, make allocating a continuously active channel to a single user an over allocation of resources. Control signals sent from a base station to a mobile station or messaging may occur only infrequently and it may not be desirable to allocate a continuously active channel for a limited purpose.

The designers of wireless telephone systems have recognized the desire for packet data applications over wireless channels. The designers have also recognized that packet data and the associated burst transmissions may be transmitted over channels that are not continuously active, but rather, allow for discontinuous transmission (DTX).

With discontinuous transmission, communication to a receiver over a channel does not occur continuously but may be cycled on and off. The receiver is then faced with the problem of determining when a signal was transmitted or when there is a lack of a signal. A receiver may easily make the DTX detection decision under ideal channel conditions. The receiver would demodulate the transmitted signals as they arrive and realize that lack of a signal to demodulate indicates that the transmitter is engaging in DTX, and is in fact not transmitting a signal.

However, a real world communication link does not operate under ideal channel conditions, nor does a real world receiver operate with an ideal demodulator. In a real world application, signal multipath, fading, path loss, noise, and interference corrupt the signal incident on the receiver. Additionally, the receiver demodulator is not ideal and may not accurately demodulate every received signal. The result of non-ideal characteristics is that a receiver demodulating a continuously transmitted signal will occasionally be unable to recover the transmitted data.

Patent publication U.S. Pat. No. 6,782,059 describes a technique for detecting discontinuous transmission (DTX) over a communication channel. A received data frame is characterized as one of a Good frame, Erasure, or DTX. If a Good frame is not initially detected, a two-dimensional quality metric is used to characterize the received frame as either an Erasure or DTX. The two-dimensional quality metric is generated using a signal to noise ratio as a first dimension and re-encoded symbol error count as a second dimension. Alternatively, re-encoded symbol energy may be used as the second dimension of the quality metric.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the figures, elements which correspond to elements already described may have the same reference numerals.

DETAILED DESCRIPTION OF THE PREFERRED EMBODIMENTS

In this description, the following abbreviations are used:
Term Meaning
3GPP The 3rd Generation Partnership Project
AM Amplitude Modulus
BER Bit Error Rate
BPSK Binary Phase Shift Keying
BS Base Station
CPC Continuous Packet Connectivity
CRC Cyclic Redundancy Check
DL Downlink
UL DPCCH Uplink Dedicated Physical Control Channel
DTX Discontinuous transmission
E-DCH Enhanced Dedicated Channel
E-DPCCH Enhanced Dedicated Physical Control Channel
E-DPDCH Enhanced Dedicated Physical Data Channel
ETSI European Telecommunications Standards Institute
F-DPCH Fractional Dedicated Physical Channel
FBI Feedback Information
FCCH Frequency Correction Channel (GSM)
GSM Global System for Mobile Communications
HARQ Hybrid Automatic Repeat Request
HS-DPCCH High-Speed Dedicated Physical Control Channel
HS-PDSCH High-Speed Physical Downlink Shared Channel HSDPA High-Speed Downlink Packet Access
L1 Layer 1 (as in OSI model)
MRC Maximum Ratio Combining
PAM Pulse Amplitude Modulation
PLCP Physical Layer Convergence Protocol (Wi-Fi)
PSK Phase Shift Keying
QAM Quadrature Amplitude Modulation
QPSK Quadrature Phase Shift Keying
SF Spreading Factor
SNR Signal to Noise Ratio
TPC Transmit Power Control
TX Transmission
UE User Equipment
UL Uplink
UMTS Universal Mobile Telecommunications System
WCDMA Wideband Code Division Multiple Access.

Figure 1:
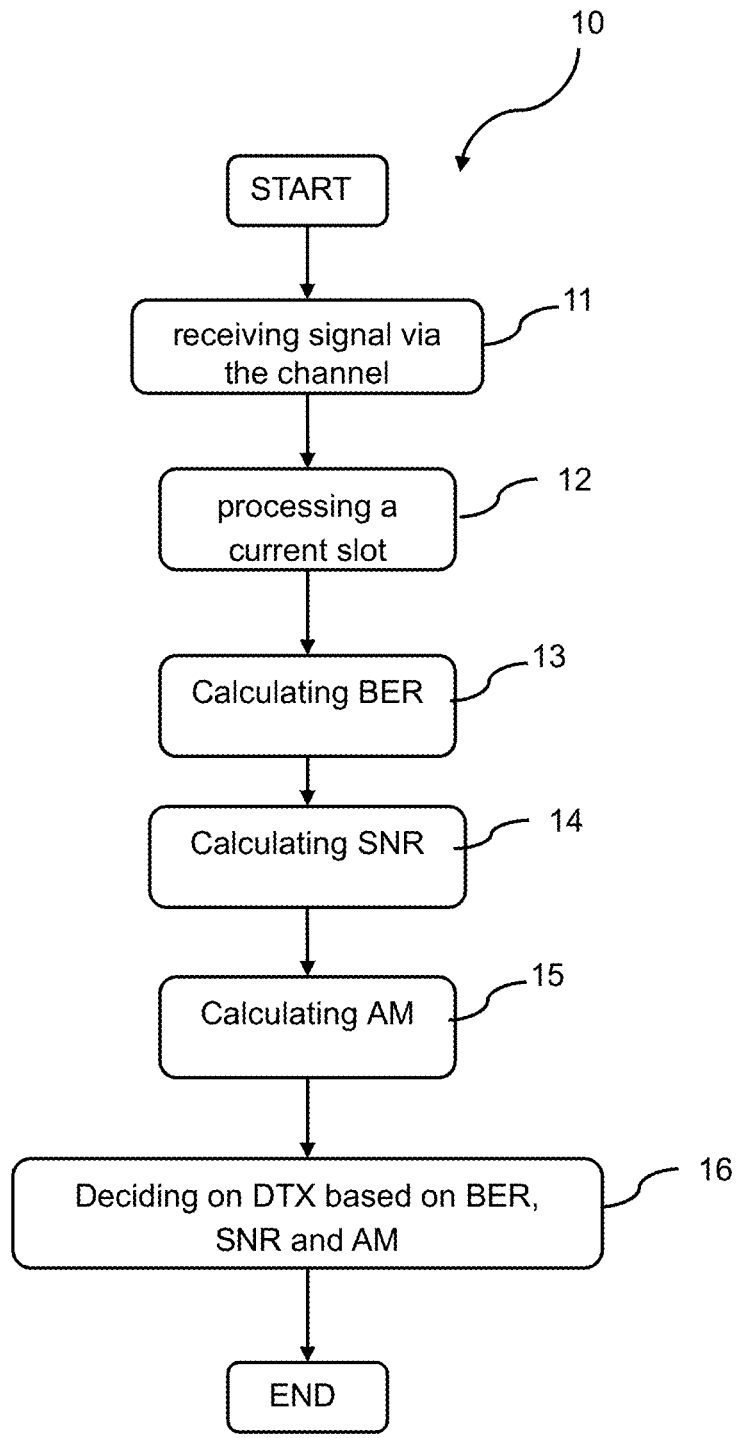
FIG. 1 shows a flow chart of an example of a method of detecting Signal Discontinuous Transmission on a channel in a wireless communication network.

FIG. 1 shows a flow chart of an example of a method of detecting Signal Discontinuous Transmission on a channel in a wireless communication network. The method starts by receiving a signal on the channel, see action 11. Next, the processing of a current slot of the signal is performed, see action 12. The current slot comprises a number of slot bits being pilot bits and non-pilot bits as will be explained later on in more detail. In a next action 13, the calculating of a bit error rate is performed using the pilot bits. Then in an action 14, the calculating of a signal to noise ratio is performed using the pilot bits. In a next action 15, the calculating of an amplitude modulus is performed using the slot bits. In an action 16, a decision is made about whether the signal indicates a discontinuous transmission on the channel using the signal to noise ratio, the bit error rate and the amplitude modulus calculated in the previous actions.

In an embodiment, the wireless communication network is a UMTS network. In a specific embodiment, the channel is an Uplink Dedicated Physical Control Channel (UL DPCCH) in a UMTS network.

Figure 2:
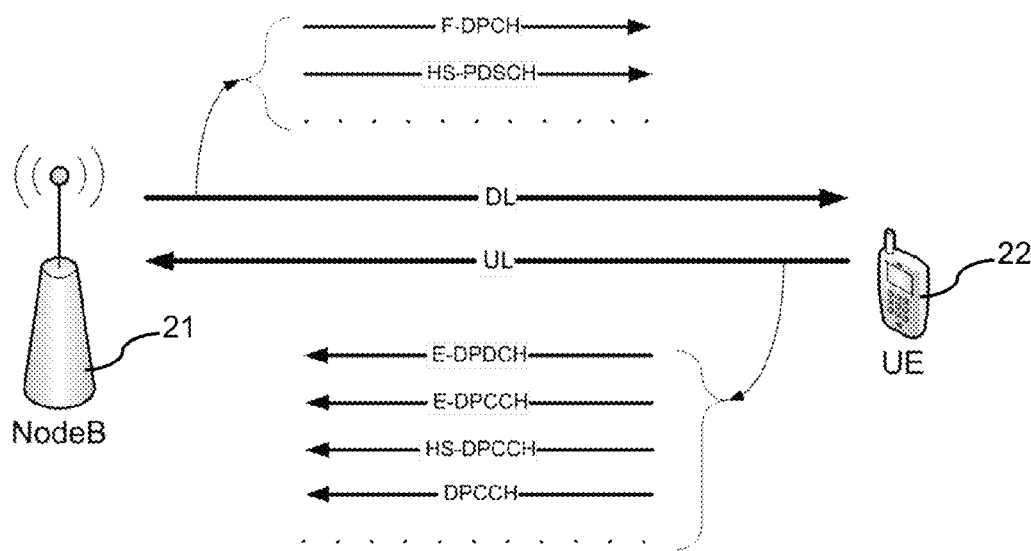
FIG. 2 shows an example of a network node.

FIG. 2 shows an example of a network node 21 and a user equipment (UE) 22. The network node 21 may be implemented in any manner suitable for the specific implementation. FIG. 2 shows an example of a network node 21 which is base station of a UMTS network and is arranged to communicate with a plurality of mobile telephones or any other UE. FIG. 2 only shows one UE 22. In this example the network node 21 uses the well-known WCDMA radio access technology to communicate with the user equipment 22. The network node 21 may also be referred to as NodeB 21. The link from the NodeB 21 to the UE 22 is called downlink (DL) and the link from the UE 22 to the NodeB 21 is called uplink (UL). Both the DL and UL are composed of several different channels, see FIG. 2. In the following only some of these channels will be discussed in more detail. Since the detection mechanism hereby presented only applies when CPC (Continuous Packet Connectivity) feature of WCDMA is enabled, we will present the channels as they behave and as they are structured when CPC is enabled.

UL DPCCH (Uplink Dedicated Physical Control Channel) is an UL channel composed of:
  Control information, further composed of:
    TPC (Transmit Power Control) bits used to control the power of the F-DPCH channel transmitted on DL by the NodeB 21 to the UE 22,
    FBI (Feedback Information) bits used to control amplitude and phase of the HS-PDSCH channel signal transmitted on each antenna on DL by the NodeB to the UE.
  Pilot sequence, which is a known data sequence used by the receiver (NodeB 21):
    as a reference to estimate the distortion introduced by the propagation channel (in terms of amplitude and phase)
    to calculate SNR (signal to noise ratio), which represents the power ratio between the wanted (known) signal and the noise (the unwanted part),
    to calculate BER (bit error rate), which represents the number of erroneous bits received divided by the total number of bits received during a period of time. This is easy to calculate because the NodeB knows what pilot bit sequence should ideally be received at any time.

HS-DPCCH (High Speed Dedicated Physical Control Channel) is an UL channel carrying control information consisting of:
  acknowledgements sent by the UE 22 in response to data packets received from NodeB on the HS-PDSCH channel,
  propagation channel quality information as seen by the UE 22 on the DL direction E-DCH (Enhanced Dedicated Channel) is an UL channel composed of:
  Data part called E-DPDCH (Enhanced Dedicated Physical Data Channel) which includes a CRC,
  Control part called E-DPCCH (Enhanced Dedicated Physical Control Channel)

F-DPCH (Fractional Dedicated Physical Channel) is a DL channel carrying TPC (Transmit Power Control) bits used to control the power of the UL DPCCH channel transmitted by the UE.

HS-PDSCH (High Speed Physical Downlink Shared Channel) is the DL channel that carries HSDPA user data packets.

The bits of each channel are mapped to symbols by a process called modulation. In WCDMA there are several modulation types in use: BPSK, QPSK, 4 PAM, 8 PAM, 16 QAM, 64 QAM and one major difference between modulation types is the number of bits that can be mapped to one symbol. For example in BPSK there is one bit per symbol, while in QPSK there are two bits per symbol, resulting in a better (double) bit rate for the same symbol rate.

The symbols of each channel are transformed into so-called 'chips' by a process called spreading. If the symbol rate before spreading is N, after spreading it will be SF*N, where SF is the spreading factor, and it will be called chip rate. In WCDMA the chip rate is fixed and =3.84 Mcps (million chips per second). This means that a higher SF for a channel will result in a smaller symbol rate.

Chip Rate=$SF$*SymbolRate

To obtain this chip rate, instead of transmitting a symbol, the spreading code is transmitted, multiplied by that symbol.

The Spreading Codes are orthogonal between them, so different channels sent at the same time on the same frequency, but with different spreading codes, can be retrieved by the inverse operation of despreading.

$$X = \text{Spread}(SpreadCode_1, data_1) + \text{Spread}(SpreadCode_2, data_2) + \ldots + \text{Spread}(SpreadCode_n, data_n)$$

$$data_p = \text{Despread}(SpreadCode_p, X) \text{ where } P = 1 \ldots n$$

The chip data obtained after the spreading process is multiplied with a pseudo random code, by a process called scrambling.

In DL:
  The Scrambling Codes differentiate transmissions from different NodeBs.
  The Spreading Codes differentiates transmissions to different UEs, from the same NodeB.

In UL:
The Scrambling Code differentiates different UEs
The Spreading Codes differentiates transmissions from the UE.

Figure 3:
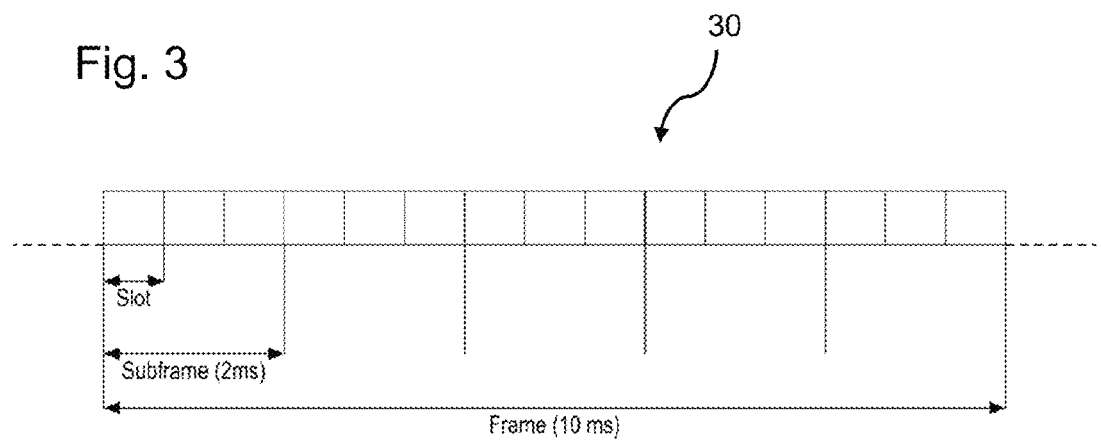
FIG. 3 shows the structure of a generic WCDMA frame.

FIG. 3 shows a structure of a WCDMA frame 30. The basic time unit in WCDMA is the chip and 38400 chips constitute a 10 ms frame. The WCDMA frame is divided into 5 sub frames of 2 ms and each sub frame is divided into 3 slots.

Figures 4, 5:
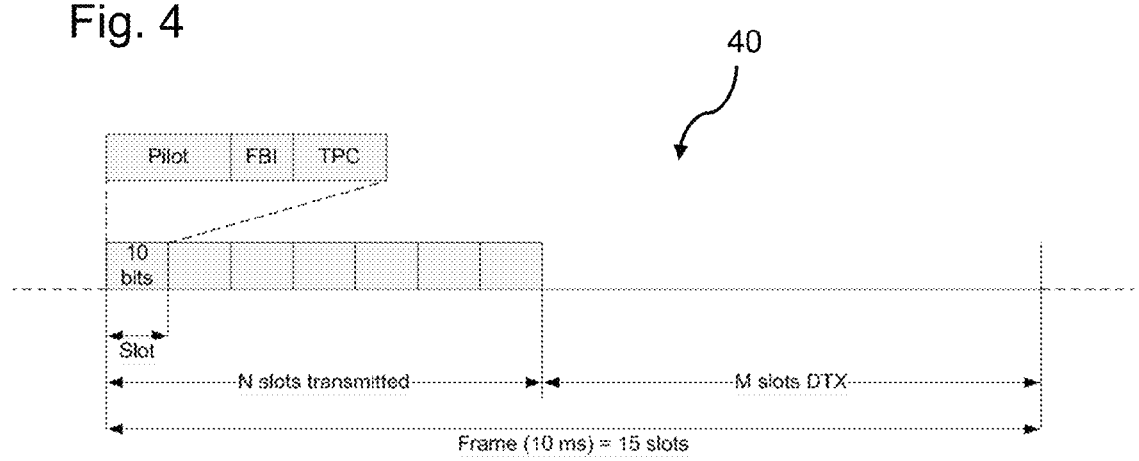
FIG. 4 shows a possible structure of a frame sent via the UL DPCCH channel.
FIG. 5 is a table in which 3 different UL DPCCH slot formats are listed that can be used when Continuous Packet Connectivity feature is enabled.

A possible structure of an UL DPCCH frame 40 is shown in FIG. 4. The UL DPCCH frame comprises 15 slots. Each slot may contain 10 bits distributed over three fields being the Pilots field, the FBI field and the TPC field. The number of bits contained in each field is given by a known configuration called UL DPCCH slot format. There are 3 different UL DPCCH slot formats that can be used when CPC feature is enabled, as shown in the table of FIG. 5. These UL DPCCH slot format are defined in the 3GPP standard 25.211 clause 5.2.1.1.

When UL DPCCH bits are transmitted, it is for an integer number of slots, see 'N slots' in FIG. 4, and when the transmission has a gap, the gap length is an integer number of slots, see 'M slots DTX'.

The UL DPCCH bits may be BPSK modulated, resulting in symbols with amplitudes of +1 (corresponding to bit 0) or −1 (corresponding to bit 1). Consequently, in case of transmission in an ideal environment without any noise, at the receiver we would expect the symbol amplitude to be always 1 or −1. In a real environment with noise, the amplitude would instead have a Gaussian distribution around the value +1 or −1. In the situation wherein nothing is transmitted (as in DTX), there would be only noise at the receiver, resulting in an amplitude looking like a Gaussian distribution around zero. Due to the presence of noise, the Gaussian distributions of the DTX and of the non-DTX overlap partly. This is the main cause of unwanted false alarms in many present DTX detection systems.

The detection method described with reference to FIG. 1 uses three measurements (also referred to as dimensions) being the BER, the SNR and the AM. By using the measurement AM, the detection method will provide fewer false alarms in good SNR conditions as compared to the known methods.

The BER (bit error rate) may be calculated using formula:

$$BER = \frac{\Sigma_{pilots}|b_e - b_r|}{N_{pilots}}$$

with
$b_e$ representing the expected bits (specified in 3GPP 25.211—tables 4 and 5)
$b_r$ representing the received bits from the receiver chain
$N_{pilots}$ representing the number of pilot bits, according to slot format (specified in 3GPP 25.211—table 2 DPCCH fields)

The SNR (signal to noise ratio) may be calculated using formula:

$$SNR = \frac{|\Sigma_{pilots} sym|^2}{N_{pilots}} * \frac{1}{E_{noise}}$$

with
sym representing the value of the symbol received and multiplied by the complex conjugate of the expected pilot symbol value (complex number)

$N_{pilots}$ representing the number of pilot bits, according to slot format (specified in 25.211—table 2 DPCCH fields)
$E_{noise}$ representing the averaged value of noise energy, filtered over multiple slots for example with an IIR (infinite impulse response) filter, i.e.

$$E_{noise} = IIR(\text{noise\_energy})$$

$$\text{with noise\_energy} = \sum_{pilots}\left|sym - \frac{\Sigma sym}{N_{pilots}}\right|^2$$

The AM (amplitude modulus) may be calculated using formula:

$$AM = \frac{1}{N_{symbols}}\sum_{symbols}\left|\frac{sym}{h}\right|$$

with
sym representing the value of the symbol received (complex number)
h representing channel coefficient (complex number)
$N_{symbols}$ representing number of symbols in a slot (10 symbols for WCDMA)

Note that unlike the BER and SNR calculations, the AM calculation uses all the symbols (pilots, FBI, TPC), so not only the pilot bits.

Figure 6:
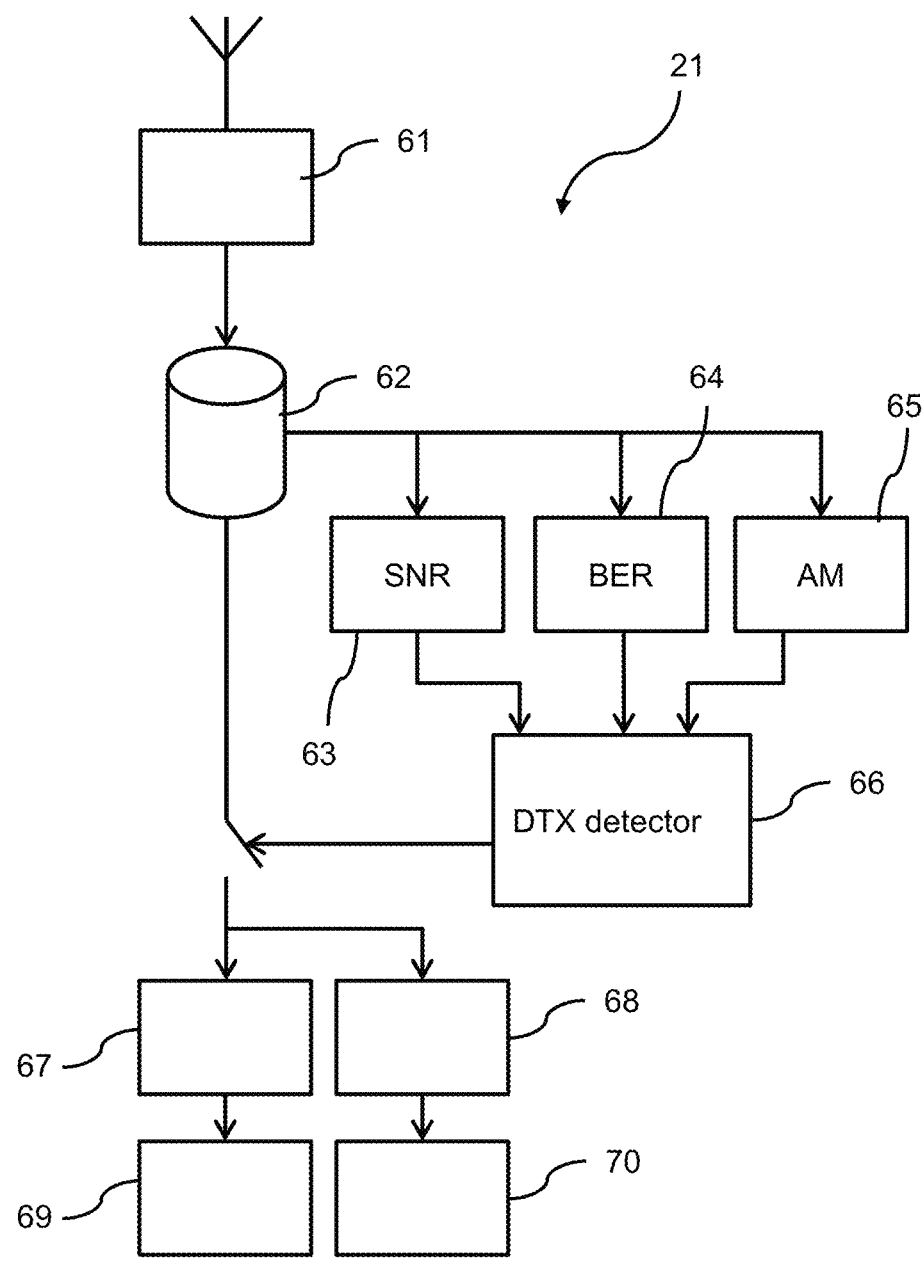
FIG. 6 schematically shows some examples of modules of the network node.

The detection method may be performed by a network node of a wireless communication network, such as the NodeB 21 in a UMTS network. FIG. 6 schematically shows some modules of the network node 21 according to an embodiment. The network node 21 of this embodiment is suitable for receiving a transmission made with an L1 baseband specific to WCDMA UE's 22. At the UE 22, see FIG. 2, UL DPCCH symbols may be spread with an UL DPCCH-specific spreading code and scrambled with a UE-specific scrambling code, resulting in UL DPCCH chips. These UL DPCCH chips may be input for an UL DPCCH L1 processing module at the NodeB 21. FIG. 6 shows a receiver 61 arranged to receive a signal from the remote transmitter 22 via a channel of the wireless communication system and to output a number of slot bits The slots bit comprise a number of pilot bits and non-pilot bits. In the receiver 61 the baseband samples received over the air may be descrambled and despread. The result is saved as UL DPCCH symbols in a memory (e.g. a database) 62. The SNR and the BER are then calculated using the UL DPCCH symbols, see SNR calculator 63 and BER calculator 64. Furthermore an AM calculator 65 is present which is arranged to calculate the AM using the UL DPCCH symbols. The values of the AM, the SNR and the BER are input to a DTX detector 66. The DTX detector 66 is arranged to take decisions on whether a current slot was active or not (i.e. DTX).

In an embodiment, the decision is based on a decision metric which uses the three inputs BER, SNR and AM. The decision may depend on a value of a multivariate decision function f(SNR, BER, AM) with SNR being the signal to noise ratio, BER being the bit error rate and AM being the amplitude modulus. The multivariate decision function may comprises a second order polynomial in AM. The multivariate decision function may comprise a second order polynomial in BER. In a particular embodiment, the multivariate decision function comprises a term being a polynomial in BER and AM divided by (1+SNR). Examples of possible decision metrics will be described later on.

In case the DTX detector 66 decides that there is no signal transmitted, there will be no further processing of the UL DPCCH symbols. This is symbolically indicated in FIG. 6 by an opened switch which is controlled by an output (i.e. a decision) of the DTX detector 66.

In case the detector 66 has decided that there is activity on the channel, the UL DPCCH symbols will be used to further process the TPC and FBI bits. A TPC block 67 processes the TPC bits, and a FBI block 68 processes the FBI bits, see also FIG. 4. The TPC processor 67 performs MRC on the received symbols, decodes the TPC bits and then re-encodes them. The output of the TPC processor 67 is processed by a power controller 69. The power controller 69 computes the power required by the UE 22 and adjusts the NodeB transmission power. The FBI processing block 68 is arranged to decode feedback information bits that are sent on the UL DPCCH channel. The FBI processing block 68 performs MRC (maximum ration combining) on the received symbols and decodes the FBI bits. A Closed Loop Transmit Diversity block 70 is arranged to compute the phase and gain adjustment for each diversity antenna that will be used in NodeB transmission.

Figure 7:
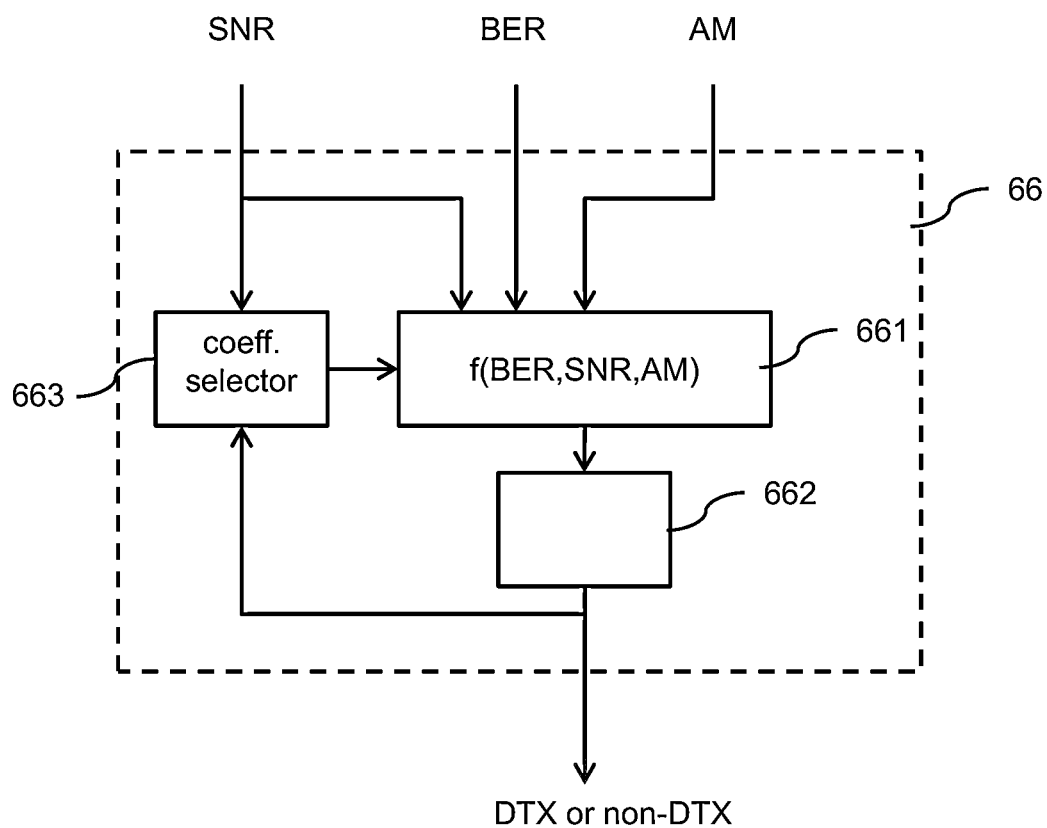
FIG. 7 schematically shows an embodiment of the DTX detector.

The network node 21 may be arranged to make the DTX decision depending on a value of a decision function f with f being a non-linear polynomial function of the signal to noise ratio (SNR), the bit error rate (BER) and the amplitude modulus (AM). FIG. 7 schematically shows an embodiment of the DTX detector 66. In this embodiment, the DTX detector 66 comprises a decision metric module 661 which receives the SNR, the BER and the AM. The DTX detector 66 also comprises a decision maker 662 which receives the value of the calculated metric and will output a Boolean being DTX or non-DTX. If the Boolean value is DTX, the processing of the (further) symbols will be stopped as was described with reference to FIG. 6.

The decision metric module 661 may be implemented in any manner suitable for the specific implementation. FIG. 7 shows an example of the decision metric module 661 in which the module uses a number of coefficients for defining the polynomial function f. A possible non-linear polynomial function using six coefficients $c_0$, $c_1$, $c_2$, $c_3$, $c_4$, $c_5$, $c_6$ is:

$$f = c_0 + c_1 AM + c_2 AM^2 + c_3 BER^2 + \frac{c_4 + c_5 AM + c_6 BER}{1 + SNR} \quad (1)$$

The coefficients may be determined in a dynamic way. They may be selected from a list of possible values depending on the value of the SNR. Selection may also depend on the decision on whether the signal during a previous slot was DTX or non-DTX.

In the embodiment shown in FIG. 7, the DTX detector 66 comprises a coefficient selector 663 which is arranged to select the coefficients $c_0$, $c_1$, $c_2$, $c_3$, $c_4$, $c_5$, $c_6$ depending on the value of the SNR. Table 1 shown below shows possible values for the coefficients $c_0$, $c_1$, $c_2$, $c_3$, $c_4$, $c_5$, $c_6$ for the embodiment mentioned above.

In table 1 there are two sets of values for the coefficients; one for when the SNR value is relatively high (i.e. >1.2 dB) and last (i.e. previous) slot was active (enabled), the other set refers to either low SNR (i.e. <=1.2 dB) or last slot was inactive. As can be seen in the second row of table 1, in case of low SNR or if the previous slot is DTX, the coefficients are different from the first row to get good results in any scenario.

The coefficients $c_1$, $c_2$ and $c_5$ are set to zero if the SNR is below a predefined threshold, e.g. 1.2 dB. Setting $c_1$, $c_2$ and $c_5$ to zero will exclude the AM from the function f. If the SNR is too low, the calculated AM will not be reliable and may cause a false alarm. The values for the coefficients $c_0$, $c_1$, $c_2$, $c_3$, $c_4$, $c_5$, $c_6$ may also be selected depending on a transmission status of a previous slot, and the coefficients $c_1$, $c_2$ and $c_5$ are set to zero.

The value of AM is not used in two cases: if the SNR value is too low or if last slot was inactive. In case of a too low SNR, the AM will generate an overall high probability of false alarm. When the last slot was inactive, the symbol amplitude estimate might not be accurate resulting in a high variance of the amplitude modulus estimation.

It is noted that other metrics can be used having a polynomial function of the SNR, BER and the AM. Experiments have shown that the use of a non-linear polynomial results in a better performance.

In the WCDMA CPC scenario there are UL DPCCH slot formats with 6, 7 or 8 pilots. According to an embodiment, the values for the coefficients $c_0$, $c_1$, $c_2$, $c_3$, $c_4$, $c_5$, $c_6$ are selected depending on how many pilot bits are in the currently received slot. Selecting the coefficients depending on the number of pilots per slot may be advantageous because measurements (BER, SNR) are more accurate when they have more samples (pilots). The coefficients given in the example in table 1 could be used for the worst case of 6 pilots, see also FIG. 5. In this further embodiment, a selection table such as table 1 could be used but having the number of pilots as an additional input parameter. There will not just be 2 rows of coefficients, but 6 rows, i.e. for all slot formats used for UL DPCCH in CPC. The preferred coefficients values of such a coefficient selection table could be determined by means of performing suitable tests or simulations.

In formula (1) the decision function comprises the factor $$f(SNR) = \frac{1}{1 + SNR}$$

This is a factor relating to the measurement of noise per signal power, i.e. a dimension of wrongfulness similar to BER that measures error. Using this particular function of SNR resulted in an improvement in the DTX detection decision during empirical experiments.

TABLE 1

|  | $C_0$ | $C_1$ | $C_2$ | $C_3$ | $C_4$ | $C_5$ | $C_6$ |
|---|---|---|---|---|---|---|---|
| SNR > 1.2 dB AND last slot enabled | −9.8513 | 27.1955 | −9.2822 | −13.4742 | 4.5786 | −5.8399 | 5.4570 |
| SNR <= 1.2 dB OR last slot DTX | 7.8130 | 0 | 0 | −17.1367 | 14.8564 | 0 | 11.4424 |

Figure 8:
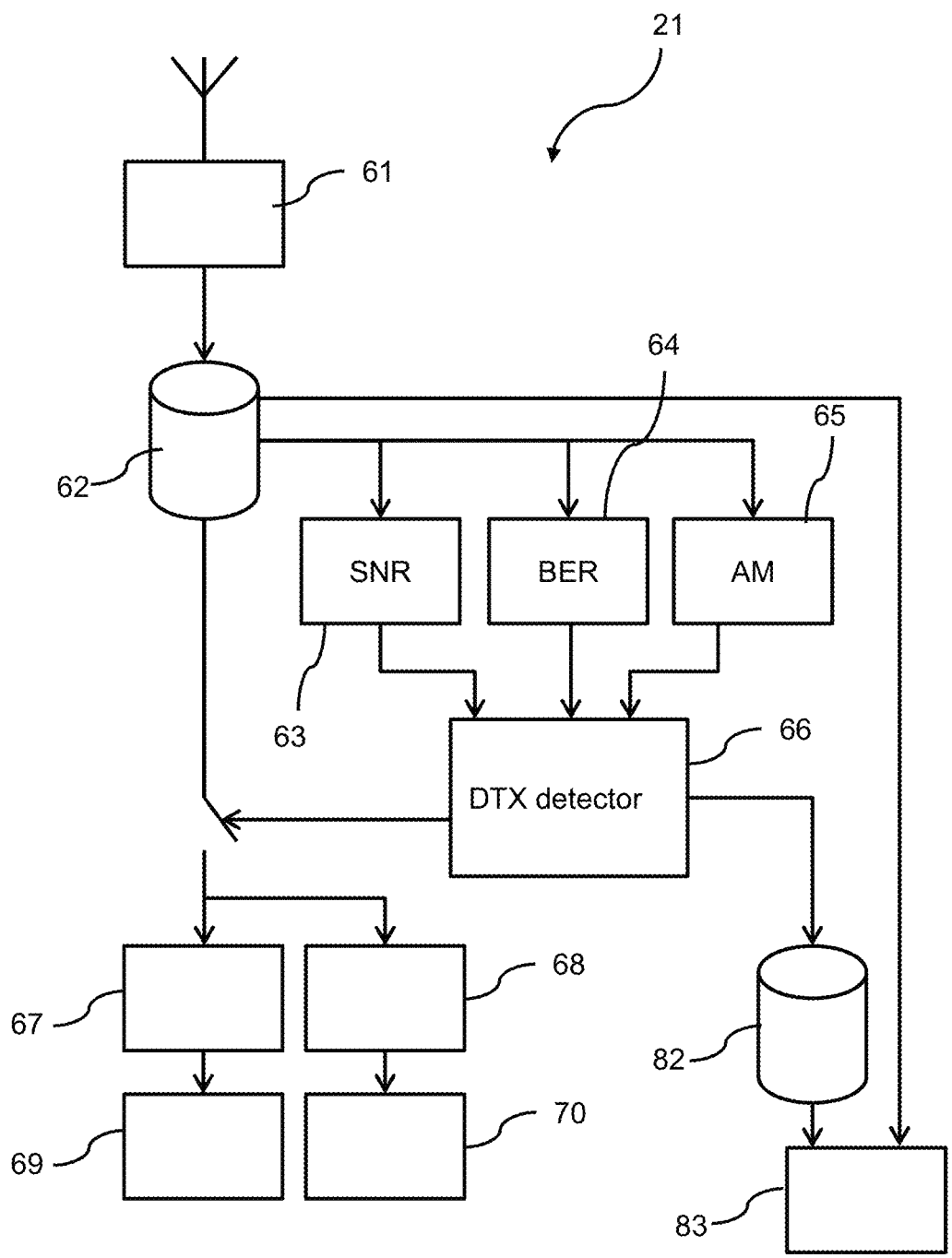
FIG. 8 shows a further example of the network node comprising the modules shown in the example of FIG. 6 plus two additional modules.

FIG. 8 shows a further example of the network node 21 comprising the modules shown in the example of FIG. 6 plus two additional modules. A slot history storage 82 is storing the history of slot activity. So for each received slot, the transmission status is stored. The transmission status can be DTX or non-DTX. The slot history and the UL DPCCH symbols stored in the database 62, are input to a Channel Estimation module 83. The Channel Estimation module 83 computes the distortion introduced by the propagation channel, so that the initial signal can be retrieved as it was transmitted.

The DTX detection method may be enhanced by selecting the coefficients depending on a speed of the UE 22. It is recalled that the UE 22 may be a mobile device (e.g. a mobile telephone) being carried around by a user. If the receiver (i.e. the network node 21) can measure the speed of the UE, the method can make use of a coefficient selection table as described above having multiple entries in the coefficients table for different classes of speed (e.g. static, pedestrian, vehicular, high speed train).

The DTX detection on the UL DPCCH channel as described above could be used to interact with E-DCH detection. This may be done using a cumulative method, an aggregation method or a pattern method. In the cumulative method, the previously defined algorithm may be executed on all the symbols of the 3 slots (e.g. for 6 pilots/slot=>18 pilot symbols). Only when the detection metric in detector 66 is positive the E-DCH detection should run.

In the aggregation method the detection of UL DPCCH is run per slot on each of the three slots. In case that all the 3 slots are inactive, the E-DCH detection should not run.

In the pattern method a pattern in the consecutive slot decisions is used. Because there is a preamble and post amble to E-DCH being sent on the UL DPCCH channel before and after the E-DCH signal, some specific patterns could be defined when and when not to detect E-DCH. Before the E-DCH signal is sent, on UL DPCCH a preamble of 2 slots is sent. In the embodiment of FIG. 8, the slot history storage 82 contains a number of slot decisions that may be used to decide on whether to detect E-DCH. The table 2 below shows some scenarios. Slots 0,1,2 are the 3 slots in a current sub-frame, and slots 3,4,5 are the slots in a previous sub-frame.

TABLE 2

| Slot decision | | | | | | Detect | |
|---|---|---|---|---|---|---|---|
| 5 | 4 | 3 | 2 | 1 | 0 | E-DCH | Description |
| 0 | 0 | 0 | — | — | — | 0 | There was no preamble |
| 1 | 0 | 0 | — | — | — | 0 | There was no preamble, slot 5 is postamble |
| — | — | — | 0 | 0 | 0 | 0 | Current subframe was inactive |
| — | 0 | 1 | — | — | — | 1 | Maybe there was a preamble, run detection to make sure |
| — | 1 | 0 | — | — | — | 1 | Maybe there was a preamble, run detection to make sure |
| — | 1 | 1 | — | — | — | 1 | There was a preamble, run detection |

It is noted that the DTX detection method described could be used on any WCDMA L1 software for NodeB. Alternatively, the DTX detection method could be used in other radio telecommunications technologies such as GSM transmission bursts and UE synchronization or for Wi-Fi preamble detection. The invention is suitable for any symbol sequence with a prior known sequence, and can be applied as long as the three measurements can be applied.

In GSM, transmission bursts have a mid-amble of pilots. This mid-amble is called a training sequence and can be made of 26 or 64 pilots. These bursts are defined in ETSI GSM 05.02. As an example, the detection algorithm described above could be used as a white-space scanner.

GSM UE synchronization or NodeB cell search can use the described DTX detection method on the FCCH channel to detect the GSM BS frequency. The FCCH channel is composed of a fixed sequence of 0's. It is defined in ETSI GSM 05.02. A UE may have hardware scanners for detecting such a fixed sequence. The suggested detection algorithm could be applied to a NodeB part of a self-organizing network that needs to scan for other adjacent technologies.

Wi-Fi uses a preamble of 10 symbols, called PLOP Preamble, which is sent at the beginning of a physical data channel. The invention could be used to detect when transmission becomes active on either end. An application for this would be collision detection.

The invention may be implemented in a computer program for running on a computer system, at least including code portions for performing actions of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

Figure 9:
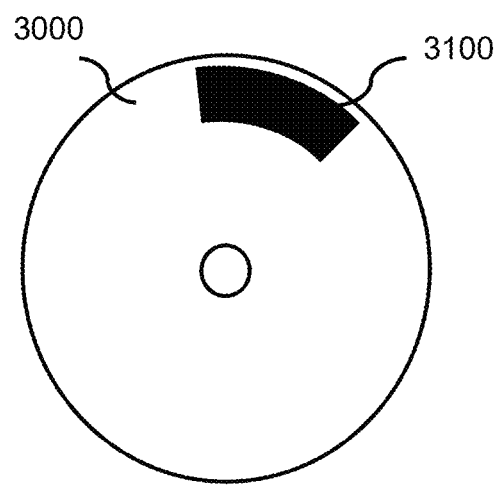
FIG. 9 shows a non-transitory computer readable medium embodying a computer program.

FIG. 9 shows a non-transitory computer readable medium 3000 embodying a computer program 3100, the computer program 3100 comprising instructions for causing a programmable apparatus to perform a method of DTX detection as described above. The computer program 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 9 as an optical disc, the computer readable medium 3000 may be any suitable computer readable medium, such as a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the scope of the invention as set forth in the appended claims. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or actions then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network node of a wireless communication network, the network node comprising:
   a receiver arranged to receive a signal from a remote transmitter via a channel of the wireless communication system and to output a number of slot bits, the number of slot bits comprising a number of pilot bits and non-pilot bits;
   a bit error rate calculator arranged to calculate a bit error rate using the pilot bits;
   a signal to noise calculator arranged to calculate a signal to noise ratio using the pilot bits;
   an amplitude modulus calculator arranged to calculate an amplitude modulus using the slot bits; and
   a discontinuous transmission (DTX) detector arranged to make a decision about whether the signal indicates a discontinuous transmission on the channel using the signal to noise ratio, the bit error rate and the amplitude modulus.

2. A network node according to claim 1, wherein the DTX detector is arranged to make the decision depending on a value of a multivariate decision function f(SNR, BER, AM) with SNR being the signal to noise ratio, BER being the bit error rate and AM being the amplitude modulus.

3. A network node according to claim 2, wherein the multivariate decision function comprises a second order polynomial in AM.

4. A network node according to claim 2, wherein the multivariate decision function comprises a second order polynomial in BER.

5. A network node according to claim 4, wherein the multivariate decision function comprises a term being a polynomial in BER and AM divided by (1+SNR).

6. A network node according to claim 5, wherein the decision function f is defined by:

$$f = c_0 + c_1 AM + c_2 AM^2 + c_3 BER^2 + \frac{c_4 + c_5 AM + c_6 BER}{1 + SNR}$$

with
   AM being the amplitude modulus,
   BER being the bit error rate,
   SNR being the signal to noise ratio,
   $c_0$, $c_1$, $c_2$, $c_3$, $c_4$, $c_5$, $c_6$ being coefficients.

7. A network node according to claim 6, wherein values for the coefficients, $c_0$, $c_1$, $c_2$, $c_3$, $c_4$, $c_5$, $c_6$, of the decision function are selected depending on the signal to noise ratio.

8. A network node according to claim 7, wherein values for the coefficients, $c_0$, $c_1$, $c_2$, $c_3$, $c_4$, $c_5$, $c_6$, of the decision function are selected depending on y a transmission status of a previous slot.

9. A network node according to claim 8, wherein values for the coefficients, $c_0$, $c_1$, $c_2$, $c_3$, $c_4$, $c_5$, $c_6$, of the decision function are selected depending on how many pilot bits are in the current slot.

10. A network node according to claim 9, wherein values for the coefficients $c_0$, $c_1$, $c_2$, $c_3$, $c_4$, $c_5$, $c_6$, of the decision function are selected depending on a speed of the transmitter transmitting the signal.

11. A network node according to claim 10, wherein the coefficients $c_1$, $c_2$ and $c_5$ are set to zero if the signal to noise ratio is below a predefined threshold.

12. A network node according to claim 11, wherein the coefficients $c_1$, $c_2$ and $c_5$ are set to zero if for the previous slot a discontinued transmission was detected.

13. A network node according to claim 1, wherein the wireless network is a Universal Mobile Telecommunications System (UMTS) network using Wideband Code Division Multiple Access (WCDMA), and wherein the channel is an uplink (UL) dedicated physical control channel (DPCCH) channel.

14. A method of detecting Signal Discontinuous Transmission on a channel in a wireless communication network, the method comprising:
   receiving, at a receiver, a signal on the channel;
   processing a current slot of the signal, the current slot comprising a number of slot bits, the number of slot bits comprising a number of pilot bits;
   calculating, at a bit error rate calculator, a bit error rate using the pilot bits;
   calculating, at a signal to noise calculator, a signal to noise ratio using the pilot bits;
   calculating, at an amplitude modulus calculator, an amplitude modulus using the slot bits; and
   making, at a discontinuous transmission (DTX) detector, a decision about whether the signal indicates a discontinuous transmission on the channel using the signal to noise ratio, the bit error rate and the amplitude modulus.

15. A method according to claim 14, wherein the decision is made depending on a value of a multivariate decision function f(SNR, BER, AM) with SNR being the signal to noise ratio, BER being the bit error rate and AM being the amplitude modulus.

16. A method according to claim 15, wherein the multivariate decision function comprises a second order polynomial in AM.

17. A method according to claim 16, wherein the multivariate decision function comprises a second order polynomial in BER.

18. A method according to claim 17, wherein the multivariate decision function comprises a term being a polynomial in BER and AM divided by (1+SNR).

19. A method according to claim 18, wherein the decision function f is defined by:

$$f = c_0 + c_1 AM + c_2 AM^2 + c_3 BER^2 + \frac{c_4 + c_5 AM + c_6 BER}{1 + SNR}$$

with
AM being the amplitude modulus,
BER being the bit error rate,
SNR being the signal to noise ratio,
$c_0, c_1, c_2, c_3, c_4, c_5, c_6$ being coefficients.

20. A non-transitory computer readable medium embodying a computer program comprising instructions for causing a programmable apparatus to perform a method, the method comprising:
receiving a signal on the channel;
processing a current slot of the signal, the current slot comprising a number of slot bits, the number of slot bits comprising a number of pilot bits;
calculating a bit error rate using the pilot bits;
calculating a signal to noise ratio using the pilot bits;
calculating an amplitude modulus using the slot bits; and
making a decision about whether the signal indicates a discontinuous transmission on the channel using the signal to noise ratio, the bit error rate and the amplitude modulus.

* * * * *